United States Patent [19]
Yamashita

[11] Patent Number: 5,928,613
[45] Date of Patent: Jul. 27, 1999

[54] APPARATUS FOR ACETYLATING CELLULOSE

[75] Inventor: Mitsuru Yamashita, Himeji, Japan

[73] Assignee: Daicel Chemical Industries, Ltd., Osaka, Japan

[21] Appl. No.: 09/092,979

[22] Filed: Jun. 8, 1998

Related U.S. Application Data

[62] Division of application No. 08/787,565, Jan. 22, 1997.

[30] Foreign Application Priority Data

Feb. 8, 1996 [JP] Japan ......................................... 8-48185

[51] Int. Cl.$^6$ .................................. B01J 8/04; B01J 10/00
[52] U.S. Cl. ........................... 422/188; 422/189; 422/190; 422/191; 422/192; 422/193; 422/194; 536/69; 536/70; 536/71; 536/73; 536/74; 536/76
[58] Field of Search .................................. 536/69, 70, 71, 536/73, 74, 76; 422/139, 140, 141, 142, 188, 189, 190, 191, 192, 193, 194, 195

[56] References Cited

U.S. PATENT DOCUMENTS 4,234,718  11/1980  Brown .......................................... 536/69
4,590,266   5/1986  Yamashita et al. ......................... 536/69
5,371,207  12/1994  Zhuang ....................................... 536/58

FOREIGN PATENT DOCUMENTS 25761  2/1990  Japan .

*Primary Examiner*—Nathan M. Nutter
*Attorney, Agent, or Firm*—Birch, Stewart, Kolasch & Birch, LLP

[57] ABSTRACT

In a production process of a cellulose acetate which comprises (a) a reduced pressure-acetylation step of acetylating a cellulose under a reduced pressure in the presence of sulfuric acid or other acidic catalyst, with distilling off a gaseous phase component of the reaction system out of the system, and (b) a post-acetylation step of allowing the acetylation to further proceed by increasing the pressure as compared with the pressure of the reduced pressure-acetylation step by means of release of the pressure reduction of the reaction system or the like, the shift operation from the reduced pressure-acetylation step to the post-acetylation step is conducted by taking a distilling rate of a distillate in the reduced pressure-acetylation step as an index to control the reaction temperature of the post-acetylation step. The shift operation from the reduced pressure-acetylation step to the post-acetylation step may also be conducted by taking a distilling rate after the distilling rate in the reduced pressure-acetylation step has reached a maximum value.

6 Claims, 1 Drawing Sheet

APPARATUS FOR ACETYLATING CELLULOSE

This application is a divisional of copending application Ser. No. 08/787,565, filed on Jan. 22, 1997, the entire contents of which are hereby incorporated by reference.

FIELD OF THE INVENTION

This invention relates to a reaction control method and a reaction control apparatus for controlling acetylation of a cellulose, which are useful for production of a cellulose acetate. Such cellulose acetate is used for a tobacco filter tow (fiber bundle), a fiber, a photographic film and an artificial kidney, typically speaking.

BACKGROUND OF THE INVENTION

As an typical example of commercial production processes of a cellulose acetate, there has been known a process which comprises acetylating a cellulose by means of an acetylating agent such as acetic anhydride in the presence of an acidic catalyst such as sulfuric acid. The acetylation of the cellulose is a vigorously exothermic reaction, and when a reaction temperature, in particular a peak temperature (highest temperature) is high, depolymerization of a cellulose proceeds so that the polymerization degree of the cellulose acetate decreases and the quality of the product is deteriorated. Therefore, it is significantly important to control or regulate the reaction temperature in the acetylation reaction with high accuracy for the purpose of sustaining qualities of the cellulose acetate.

Japanese Patent Publication No. 5761/1990 (JP-B2-5761) discloses a production process of a cellulose acetate using a cellulose as a raw material, acetic anhydride as an acetylating agent, acetic acid as a solvent and sulfuric acid as a catalyst, which method is characterized by reducing a pressure in the reaction system over the whole period or in a partial period inclusive of the initial stage of an acetylation reaction, condensing a generated vapor and distilling a resultant product out of the reaction system to concentrate the reaction product. This literature mentions that, in the course of the reaction, when the pressure reduction is broken turning to an ambient pressure (atmospheric pressure) at the point that the vapor component is distilled off in a predetermined amount, the reaction temperature rises to reach a peak temperature due to a reaction heat in the acetylation of unreacted cellulose provided that the heat is radiated to some extent, and thereafter the temperature descends or decreases, and that the peak temperature can be controlled or regulated with a distilling amount of the vapor component taken as an index.

However, when an acetylation step under a reduced pressure (reduced pressure-acetylation step) and an acetylation step (post-acetylation step) which comprises increasing the reaction pressure and raising the reaction temperature due to a reaction heat of a rest of the cellulose to allow the acetylation reaction to further proceed are conducted continuously in a batch system, dispersion of the peak temperature in the post-acety-lation step in a process, as mentioned above, where pressure reduction control is ceased by taking the distilling amount of a vapor component as an index to raise the reaction temperature. Accordingly, the polymerization degree of a product cellulose acetate varies and stable qualities will not be expected.

This is probably because of the following reasons. That is, a cellulose used as a raw material generally contains moisture, so that hydrolysis of acetic anhydride due to the moisture proceeds in addition to the acetylation of the cellulose in the first half of the reduced pressure-acetylation step. Therefore, the producing amounts of the acetic acid and reaction heats in the reaction system vary or differ depending on the moisture contents of the material cellulose, and hence the amounts of distilled liquids (distillates) vary each other. Further, the reaction system in the first half of the reduced pressure-acetylation step is unstable because the reaction temperature rises violently and the amount of internal reflux is large, and distilled amount of the distilled liquid (a mixture of acetic acid and acetic anhydride) tends to vary or shift. Thus, according to the above mentioned process, the concentrations of unreacted cellulose in the reaction system practically differ even when the amounts of the distilled liquids are the same. It should be considered that the quantity of heat generated in the post-acetylation step varies with variation of the concentrations of unreacted cellulose, so that the peak temperature fluctuates or varies.

On the other hand, a peak temperature of a reaction can be stabilized, theoretically, by using an adiabatic reactor as an acetylation reactor, and strictly controlling the amounts of charged material, acetylating agent, reaction solvent and catalyst, and the reaction temperature. When the cellulose acetate is, however, produced commercially, a lot of instruments are required to take an enormous cost for the purpose of using a complete adiabatic system as the acetylation reactor, or precisely controlling the amounts or proportions of the acetylating agent or others and temperature.

SUMMARY OF THE INVENTION

It is, therefore, an object of the invention to provide a method and apparatus for reaction control which insure easy and precise control of the reaction temperature of an acetylation reaction where an acetylation step of a cellulose is conducted in a batch system.

It is another object of the invention to provide a method and apparatus for reaction control which insure minimizing dispersion of peak temperature in a post-acetylation step in the production of a cellulose acetate by carrying a reduced pressure-acetylation step and a post-acetylation step in a batch system.

A yet another object of the invention is to provide a production process of a cellulose acetate which insures a cellulose acetate having stabilized qualities.

The inventor of the present invention made intensive investigations to accomplish the above-mentioned object and, as a result, found that when a shift operation from the reduced pressure-acetylation step to the post-acetylation step is carried out by taking a distilling rate of a distillate in the reduced pressure-acetylation step as an index (barometer or indicator), the peak temperature in the post-acetylation step can be controlled precisely. The present invention has been accomplished based on the above findings.

Thus, the present invention provides a reaction controlling method comprising; (a) a reduced pressure-acetylation step for acetylating a cellulose under a reduced pressure in the presence of an acidic catalyst with distilling off a gaseous phase component of a reaction system out of the system, and (b) a post-acetylation step for allowing the acetylation reaction to further proceed under a higher pressure than that of the reduced pressure-acetylation step, for the production of a cellulose acetate in a batch system by controlling a reaction temperature in the post-acetylation step, wherein a shift operation from the reduced pressure-acetylation step to the post-acetylation step is conducted by taking a distilling rate of a distillate in the reduced pressure-acetylation step as an index.

The present invention further provides a reaction control apparatus for controlling a reaction in a production process of a cellulose acetate which process comprises; (a) a reduced pressure-acetylation step for acetylating a cellulose under a reduced pressure in the presence of an acidic catalyst with distilling off a gaseous phase component of the reaction system out of the system, and (b) a post-acetylation step for allowing the acetylation reaction further proceed under a higher pressure than that of the reduced pressure-acetylation step, wherein the apparatus comprises; an acetylation reactor, a pressure reducing means for reducing a pressure of the reaction system, a condensing means for condensing a distillate distilled from the reaction system, a measuring means for measuring a distilling rate of the distillate in the reduced pressure-acetylation step, and a pressure regulating means for increasing a pressure of the post-acetylation step as compared with a pressure of the reduced-acetylation step based on a measured value measured by the measuring means.

The invention further relates to a production process of a cellulose acetate as controlled by the above-mentioned reaction controlling method.

DETAILED DESCRIPTION OF THE INVENTION

Figure 1:
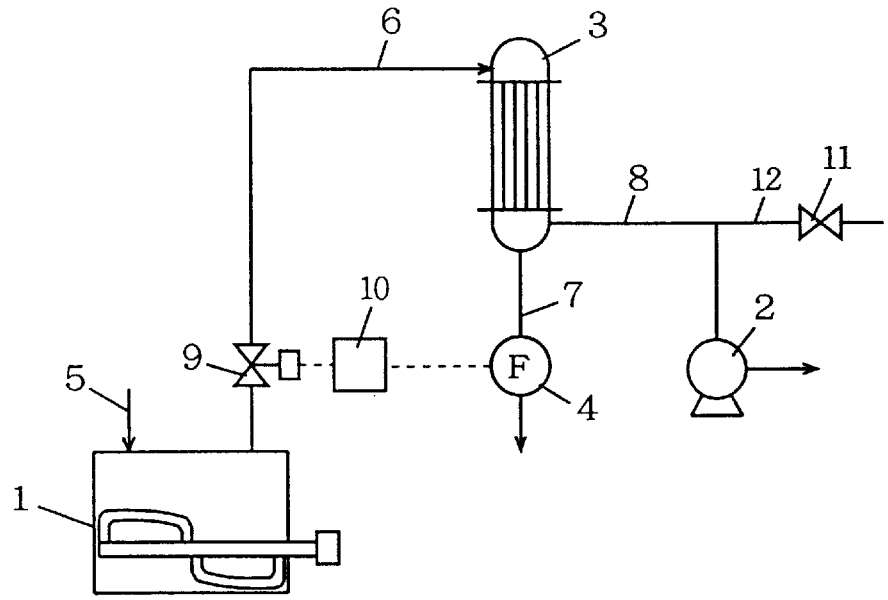
FIG. 1 is a schematic diagram showing an embodiment of the reaction control apparatus of the present invention.

Embodiments of the present invention are now described on the basis of the accompanying drawings. FIG. 1 is a schematic diagram showing an embodiment of the reaction control apparatus of the present invention.

This reaction control apparatus comprises an acetylation reactor 1 for acetylation of a cellulose under stirring with the use of an acetylating agent, a vacuum pump 2 for reducing the pressure of the reaction system, a condenser 3, and a flow meter 4 for determining a distilling rate of a distilled liquid (distillate) as condensed by the condenser 3.

The acetylation reactor 1 is equipped with a material supply line 5 for feeding a starting material, and a gas-withdrawal line 6 for introducing a gas of a gaseous fraction of the reaction system to the condenser 3. The gas-withdrawal line 6 is provided with a valve 9 for releasing the pressure reduction of the reaction system. The condenser 3 is equipped with a distilled liquid (distillate)-withdrawal line 7 for withdrawal of a condensed distillate, and in the distilled liquid-withdrawal line 7 is provided with the flow meter 4. The condenser 3 is equipped with a pressure-reducing line 8 communicating with the vacuum pump 2, and the pressure-reducing line 8 is installed with an air-inlet line 12 provided with a valve 11 for regulation or control of the pressure of the reaction system.

The apparatus is further provided with a control means 10 for imparting a releasing signal to the valve 9, where the releasing signal is for releasing the pressure reduction of the reaction system provided that R reaches equal to or lower than Rs wherein a measured value R of the flow meter 4 is compared with a predetermined reference value Rs. Therefore, when the distilling rate of the distilled liquid becomes the predetermined reference value or less (i.e. the rate reaches a threshold), the pressure reduction of the reaction system can be released or cancelled automatically.

The control means 10 is composed of the flow meter 4 provided with a flow sensor, a differentiating circuit for differentiating a flow data (flow volume data) as detected by the flow meter at each given interval to give a differential data corresponding to a distilling rate, a comparison circuit for comparing the differential data (measured value R) obtained by the differentiating circuit with the reference value Rs, and a control circuit for imparting a signal for releasing the pressure reduction from the comparison circuit to a driving circuit of the pressure reduction releasing means (valve 9) when the differential data reaches the reference value. In more concrete, for example, the flow data (flow rate) detected by the flow meter is integrated momently, and the integrated value, e.g. the amount distilled in one minute is converted into a distilling rate (measured value R). At the time when the measured value reaches equal or less than the reference value Rs, a bit for releasing the reduction of the pressure is made. The control means 10 may be composed of a circuit for reading the bit, and a control circuit for imparting a signal for releasing the pressure reduction to the driving circuit of the pressure reduction releasing means (valve 9).

As the acetylation reactor 1, use can be made of any of reactors usually used for the production of a cellulose acetate. Preferred example of the acetylation rector includes a mixing reactor such.as a kneader (e.g. a biaxial kneader). As the vacuum pump 2 and condenser 3, use may be made of any of conventional equipments, respectively. The species of the flow meter 4 is not particularly limited as far as it measures the distilling rate of the distilled liquid (distillate), and includes, for example, a mass flow meter such as micromortion flow meter, and a positive displacement flow meter. The preferred flow meter includes a mass flow meter in which squeezing of lines is not required and blocking or clogging caused by a foreign matter as contaminated by entrainment does not tend to occur. Incidentally, for the purpose of inhibiting entry of foam into the flow meter 4, it is preferable to provide a deaerator in the upstream with respect to the flow meter 4 in the distilled liquid-withdrawal line 7.

As the valve 9, any device can be employed provided that it can release the pressure reduction of the reaction system, such as a stop valve (shut-off valve) for intercepting the line, or a selector valve (direction control valve) by which the reactor is ventilatable with the outside to allowing the pressure of the reaction system to be atmospheric pressure. As the valve, any of various valves such as an electromagnetic valve (solenoid valve), a piston valve, a diaphragm valve and a bellows valve, typically speaking.

Meanwhile, other pressure reduction means such as an ejector and an aspirator may be-used in lieu of the vacuum pump 2. Further, the flow meter 4 may only be a means by which the distilling rate of the distillate can be measured or determined, and it may be a flow meter for determination of a distilling rate of a distilled gas. In such a case, the flow meter is installed in the gas-withdrawal line 6. The distilling rate of the distilled gas may also be shown by the pressure differential $\Delta P (=P1-P2)$ between the pressures P1 and P2 of optional two points of the passageway (channel) of the distilled gas. By way of illustration, the pressure differential $\Delta P (=P1-P2)$ between the pressure of the reactor (P1) and the pressure (P2) of an inlet of the condenser 3 (or a predetermined portion of the gas-withdrawal line 6) can be employed as the distilling rate of the distilled gas. The pressure differential $\Delta P$ can be determined by means of, for example, a differential pressure gauge (differential manometer). Further, the pressure differential $\Delta P$ may also be determined by calculating the difference between the measured values of the two pressure gauges (manometers) as disposed in the above-mentioned two points.

The valve 9 may not always release the pressure reduction of the reaction system, and it may be a pressure regulating valve which regulates a degree of the pressure ascent corresponding to the degree of opening of the valve. Moreover, it may also be other pressure regulating means such as a cock instead of the valve. The preferable pressure regulating means includes a pressure regulating means by which the pressure reduction of the reaction system is releasable. The valve 9 may only be installed or equipped in a portion which insures regulation of the pressure of the reaction system, and the valve 9 may be installed in the pressure reducing line 8, in addition to or in lieu of the above-mentioned portion.

The control means 10 is not always required. Even without the control means 10, the pressure of the reaction system can be increased by means that an operator operates the pressure regulating means such as the valve based on the measured value of the flow meter 4.

According to the reaction control apparatus, which is provided with a measuring means for measuring the distilling rate of a distillate, and a pressure regulating means for increasing the pressure of the reaction system based on the measured value of the measuring means, the pressure, and hence the reaction temperature of the reaction system can be controlled taking the distilling rate of the distillate as an index.

The method for controlling a cellulose acetylation in the production process of a cellulose acetate with the use of the above-mentioned reaction control apparatus is now described. This production process of the cellulose acetate comprises the reduced pressure-acetylation step for acetylating a cellulose under a reduced pressure in the presence of an acidic catalyst, with distilling off the gaseous phase component of the reaction system out of the system, and the post-acetylation step for allowing the acetylation reaction to further proceed under a higher pressure than that of the reduced pressure-acetylation step.

In the reduced pressure-acetylation step, the acetylation reactor 1 is charged with predetermined amounts of a cellulose, an acetylating agent and a reaction solvent from the material supply line 5, and the pressure of the reaction system is reduced by means of the vacuum pump 2 and adjusted to a predetermined pressure with the use of the valve 11. Thereafter, the acetylation reactor 1 is charged with a predetermined amount of an acidic catalyst to start the reaction.

The cellulose, acetylating agent, reaction solvent and acidic catalyst used in the reaction may respectively be any of those generally used in the production of a cellulose acetate. By way of illustration, use may be made of a sulfite-dissolving pulp and other various pulps (e.g. softwood pulp, hardwood pulp and other wood pulp), cotton linter and others as the cellulose, acetic anhydride as the acetylating agent, acetic acid as the reaction solvent and sulfuric acid as the acidic catalyst, typically speaking. A sulfuric acidacetic acid mixture may be employed as a catalyst solution. The preferred cellulose includes those pretreated and activated with the use of acetic acid or others beforehand. The pretreatment and activation may be effected by, for example, spraying the cellulose with acetic acid or water-containing acetic acid, or immersing the cellulose in acetic acid or water-containing acetic acid. The amount of acetic acid in the activation is, for instance, about 10 to 100 parts by weight, preferably about 20 to 80 parts by weight and more preferably about 25 to 50 parts by weight relative to 100 parts by weight of the cellulose.

The amounts of the cellulose, acetylating agent, reaction solvent and acidic catalyst may optionally be selected from ranges not deteriorating the reaction. By way of examples, relative to 100 parts by weight of the cellulose, the acetylating agent may be used in an amount of about 200 to 400 parts by weight (e.g. about 220 to 350 parts by weight) and preferably about 230 to 300 parts by weight, the reaction solvent is used, as the whole amount including, for instance in case of acetone, acetone for pre-treatment and acetone for diluting the catalyst, in a proportion of about 300 to 800 parts by weight (e.g. about 350 to 700 parts by weight) and preferably about 400 to 600 parts by weight, and the amount of the acidic catalyst is about 0.4 to 10 parts by weight, preferably about 0.5 to 5 parts by weight and more preferably about 0.6 to 2 parts by weight.

The degree of vacuum of the reaction system may only be a pressure which insures the reaction system to boil, and can liberally be selected according to the reaction temperature. For example, the degree of vacuum is about 40 to 150 Torr and preferably about 45 to 100 Torr. The acidic catalyst may be added at once, or it may be added in plural installments (e.g. about 2 to 5 times, preferably about twice). Addition of the acidic catalyst in plural installments practically makes the reaction control easier.

After the initial of the reaction, the temperature of the reaction system rises due to the reaction heat, and the contents in the reaction system boil. The reaction temperature once points the maximum value and gradually descends accompanying with consumption of acetic anhydride. A vapor (mixture of acetic anhydride and acetic acid) having a composition corresponding to the composition of the liquid phase components in the reactor is led to condenser 3 through the gas-withdrawal line 6. The condensate (distilled liquid) as condensed in the condenser 3 is withdrawn from the distilled liquid-withdrawal line 7. In such a case, the distilling rate of the distilled liquid is measured by the flow meter 4. Incidentally, the distilling rate of the distillate may be determined as an amount of the distillate per unit time by measuring the amount of the distilled liquid with elapse of time.

The reaction temperature of the acetylation can be selected within a range not deteriorating the acetylation and insuring inhibition of a side reaction, and is, for example, about 20 to 90° C. and preferably about 30 to 80° C., among which the reaction temperature in the reduced pressure-acetylation step is, for instance, about 20 to 70° C. and preferably about 30 to 65° C.

The distilling rate of the distilled liquid increases with an ascending reaction temperature, reaches a maximum value and thereafter descends gradually. When the acidic catalyst is added in a plurality of installments, the distilling rate of the distilled liquid may occasionally show plural maximum values accompanying with the proceeding of the reaction. By way of illustration, when the acidic catalyst is added in 2 installments, the distilling rate generally shows 2 maximum values. At the point that the distilling rate of the distilled liquid descends on or under a predetermined value (reference value) (i.e. the rate reaches a threshold) after reaching its maximum value, the gas-withdrawal line 6 is shut off by the valve 9 according to the releasing signal of the control means 10, and hence the pressure reduction of the reaction system is released, and the process shifts from the reduced pressure-acetylation step to the post-acetylation step.

Incidentally, when the reaction is intended to be controlled automatically in case that the distilling rate has one or plurality of maximum values, the control means provided with the differentiating circuit may comprise a control circuit provided with a peak detector (peak detection circuit) which is imparted with the differential data from the differentiating circuit and for detecting a peak of the differential data, a counter circuit for counting the peak obtained from the peak detection circuit, a memory circuit in which a given reference count is set, and a logical circuit for imparting the differential data from the differentiating circuit to the comparison circuit, and for imparting a signal for releasing the pressure reduction of the reaction system from the comparison circuit to a driving circuit of the pressure reduction releasing means (valve 9) when the differential data reaches the reference value Rs. In more practical, when the catalyst is added in two installments, for example, the bit for releasing the pressure reduction is made with a proviso that a certain period has been elapsed after the second addition of the catalyst, the distilled amount reaches a given value, and that the equation $R \leq Rs$ is effected twice (the comparison is made continuously with intervals of, e.g. 15 seconds).

The shut off of the gas-withdrawal line 6 may also be conducted by such a manner that an operator reads the measured value of the flow meter 4, and at the point that the measured value descents on or under the reference value, he operates the valve 9 to shut off the gas-withdrawal line 6.

The distilling rate of the distilled liquid as an index of release of the pressure reduction of the reaction system depends on an intended peak temperature in the post-acetylation step, and usually is, about 2 to 15 parts by weight per minute, preferably about 4 to 12 parts by weight per minute and more preferably about 5 to 10 parts by weight per minute when 100 parts by weight of the material cellulose is used.

The shift operation from the reduced pressure-acetylation step to the post-acetylation step may be carried out by means of release of the pressure reduction of the reaction system but it may also be effected by mitigating the degree of vacuum. When the shift operation is conducted by release of the pressure reduction of the reaction system, the post-acetylation step may be carried out in a sealed system or it may be effected in an open system under atmospheric pressure. The peak temperature in the post-acetylation step can liberally be selected according to the intended polymerization degree of the cellulose acetate, and generally is about 40 to 90° C. and preferably about 50 to 80° C.

When the pressure reduction of the reaction system is released, the pressure in the system rises so that the reaction temperature rises again due to a reaction heat of the acetylation of unreacted cellulose, and provided with a heat radiation to some extent, the temperature reaches the peak temperature and thereafter descends.

As described above, the shift operation from the reduced pressure-acetylation step to the post-acetylation step is effected by taking the distilling rate of the distilled liquid in the reduced pressure-acetylation step so that time of the shift can easily be decided with the use of the flow meter 4. Further, probably because the distilling rate of the distillate closely relates to the cellulose concentration in the reaction system, dispersion of the peak temperatures in the post-acetylation step which depends on the quantity of the reaction heat of residual cellulose can significantly be minimized. Therefore, decrease of the polymerization degree of the cellulose acetate due to depolymerization which tends to occur at a high reaction temperature can be inhibited, and a cellulose acetate having stabilized qualities or characteristics can be obtained.

The release of the pressure reduction of the reaction system may preferably be conducted by taking, as an index, the distilling rate after the rate reaches a maximum value. When the distilling rate has plural maximum values, it is preferable that the pressure reduction control of the reaction system is stopped with taking the distilling rate after the rate reaches the last maximum value as an index. When the stoppage time of the pressure reduction control is decided based on the distilling rate after reaching the maximum value, the dispersion of the peak temperature in the post-acetylation step can be inhibited or minimized extremely. It is probably because, after the distilling rate reaches the maximum value, hydrolysis of acetic anhydride due to moisture in the cellulose has already finished, almost only the acetylation of the cellulose proceeds and the system is stabilized so that the distilling rate has a closer relationship with the cellulose concentration in the reaction system.

Incidentally, the shift operation from the reduced pressure-acetylation step to the post-acetylation step may be effected by taking, as an index, the measured value of the distilling rate of a distilled gas in lieu of the distilling rate of the distilled liquid. The dispersion of the peak temperature in the post-acetylation step can also be minimized by taking the distilling rate of the distilled gas as an index. As the distilling rate of the distilled gas, use can also be made of the pressure differential $\Delta P$ (=P1–P2) of pressures P1 and P2 of optional 2 points in the passageway of the distilled gas such as a pressure differential ($\Delta P$) between a pressure of the reactor (P1) and a pressure of the inlet of the condenser 3 (P2).

After a predetermined time passes from the time that the reaction temperature reaches the peak temperature, the reaction is ceased by adding a reaction ceasing agent to the reaction mixture. The reaction ceasing agent may be any of those which do not adversely affect on workability of isolation of the cellulose acetate and quality thereof, and insure inactivation of the acidic catalyst, and includes, for instance, basic compounds [for example, alkali metal salts (e.g. potassium salts, sodium salts) and alkaline earth metal salts (e.g. calcium salts, magnesium acetate and other magnesium salts, strontium salts and barium salts)].

The average acetylation degree of the obtained cellulose acetate (cellulose triacetate) may be about 58 to 62.5%, preferably about 60 to 62.5% and more preferably about 61 to 62.5% (in particular about 61.5 to 62.5%). The viscosity average polymerization degree of the cellulose acetate is generally about 200 to 400 (e.g. about 200 to 350), preferably about 250 to 350, more preferably about 270 to 350 (e.g. about 290 to 350) and practically about 270 to 350 (e.g. about 270 to 330). The viscosity of the cellulose acetate as a 6 weight percent solution as determined by using a mixture of methylene chloride and methanol (91/9, volume %) as a solvent is, for instance, about 60 to 100 cps, preferably about 65 to 95 cps and particularly about 70 to 90 cps.

The obtained cellulose acetate may be purified, if necessary after subjected to hydrolysis for adjustment of substitution degree of acetyl groups, by a conventional purification means such as precipitation and rinsing.

According to the reaction control method of the present invention, the shift operation from the reduced pressure-acetylation step to the post-acetylation step is effected by taking the distilling rate of the distillate in the reduced pressure-acetylation step as an index, so that the reaction temperature in the post-acetylation step can precisely be controlled with ease. It further insures inhibition or minimization of the dispersion of the peak temperature in the post-acetylation step.

Further, according to the reaction control apparatus of the present invention, the pressure of the reaction system can be regulated by means of the pressure regulating means based on the measured value of the measuring means for measuring the distilling rate of the distillate in the reduced pressure-acetylation, so that the reaction temperature in the post-acetylation step can easily be controlled with accuracy.

The production process of a cellulose acetate of the invention where the reaction is controlled by the above method provides a cellulose acetate having stabilized qualities.

The following examples are intended to describe the present invention in further detail but should by no means be construed to limit the scope of the invention.

EXAMPLES

In the following examples the terms "part" and "%" respectively mean "part by weight" and "weight %", otherwise specifically defined.

Example

Using the reaction control apparatus shown in FIG. 1, a cellulose acetate was produced from a cellulose. As the material cellulose, 100 parts of a sulfite dissolved pulp was cracked into flat form, and 40 parts of acetic acid was added to the cracked pulp and the mixture was treated at about 40° C. for 20 minutes for pretreatment and activation.

Figure 2:
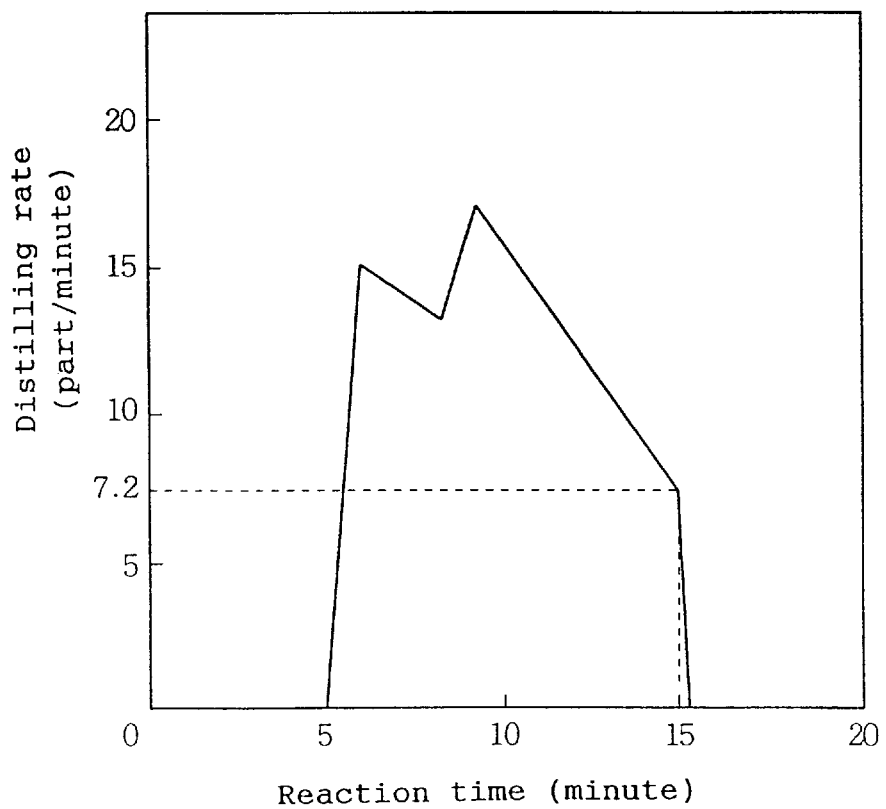
FIG. 2 is a graph illustrating the change of the distilling rate of the distilled liquid with elapse of time in the example.

The acetylation reactor (a biaxial kneader) 1 was charged with the pretreated and activated cellulose with stirring, and further charged with 270 parts of acetic anhydride and 330 parts of acetic acid. The pressure in the reactor 1 was reduced with the vacuum pump 2, and the degree of vacuum was regulated at 75 Torr. To the charge of the reactor 1 was added 28 parts of 3% sulfuric acid-acetic acid solution as a catalyst solution to start the reaction. The reaction temperature rose due to reaction heat as generated by means of acetylation of the cellulose, and it reached about 59° C. nearly corresponding to the boiling point, and maintained at almost a fixed value. After about 5 minutes from the addition of the catalyst solution, a vapor mixture of acetic anhydride and acetic acid was condensed by condenser 3 and began to distill. After about 8 minutes from the addition of the catalyst solution, 6 parts of the same catalyst solution as the above was further added to the reaction mixture. The distilling rate of a distilled liquid was determined with the flow meter 4, and change of the rate with elapse of time is shown in FIG. 2. The reaction time in the figure means elapsed time from the addition of the first catalyst solution.

As illustrated in FIG. 2, the distilling rate of the distilled liquid increased vigorously from about 5 minutes up to about 6 minutes after the addition of the first catalyst solution to reach a maximum value and thereafter descended. With the addition of the second catalyst solution, the distilling rate increased again to reach another maximum value, and descended. After about 15 minutes from the addition of the first catalyst solution, the distilling rate of the distilled liquid reached 7.2 parts/minute relative to 100 parts of the material cellulose. At this point, the valve 9 was operated or actuated and the gas-withdrawal line 6 was shut off to make the reaction system be a sealed system, and hence the process was shifted from the reduced pressure-acetylation step to the post-acetylation step. After shut off of the gas-withdrawal line 6, the reaction temperature rose and reached a peak temperature (67° C.) after about 15 minutes. After about 1 minute from the reach to the peak temperature, 11 parts of a 24% aqueous solution of magnesium acetate was added to the reaction mixture to stop the reaction. Thus obtained cellulose acetate (cellulose triacetate) was transferred into another reactor and hydrolyzed therein to give a cellulose acetate (cellulose diacetate) having an intended substitution degree of acetyl groups.

The above batch reaction procedure was repeated 103 times. In every procedure, the valve 9 was closed when the distilling rate of the distilled liquid reached 7.2 parts/minute relative to 100 parts of the material cellulose, to make inside of the reactor be a sealed system. The average value of the peak temperatures of the reactions in each procedures and the standard deviation of the peak temperatures were determined, and as a result, the average value of the peak temperatures was 67.2 (°C.) and the standard deviation of the peak temperatures was 0.34 (°C.).

Comparative Example

The batch reaction procedure of Example was repeated except that the shift operation from the reduced pressure-acetylation step to the post-acetylation step was effected by operating the valve 9 and shutting the gas-withdrawal line 6 to make the reaction system sealed at the time when the total distilling amount of the distilled liquid reached 170 parts by weight.

The above-mentioned batch reaction procedure was repeated 120 times, and in each batch reaction, the valve 9 was closed and the reaction system in the reactor was made sealed when the total distilling amount of the distilled liquid reached 170 parts by weight relative to 100 parts by weight of the material cellulose. The mean value and standard deviation of the peak temperatures of the reactions in each batch reaction were calculated, and as a result, the mean value and standard deviation of the peak temperatures were 68.0 (°C.) and 1.02 (°C.), respectively.

Incidentally, as a result of analysis of these data, the viscosity as a 6 weight percent solution of the cellulose ester (cellulose diacetate) decreased by a factor of 8 cps when the peak temperature of the acetylation rose higher than a reference temperature by a factor of 1° C., and the viscosity as a 6 weight percent solution of the cellulose acetate (cellulose diacetate) increased by a factor of 8 cps as the peak temperature descended lower than the reference temperature by a factor of 1° C. The viscosity as a 6 weight percent solution was determined by dissolving 3 g of an absolutely dried cellulose acetate (cellulose diacetate) in 50 ml of 95 weight percent aqueous solution of acetone with the use of Ostwald viscometer.

As apparently shown in these results, the dispersion of the peak temperatures in the post-acetylation step could be minimized to a great extent, and products having stabilized qualities could be obtained by shifting the process from the reduced pressure-acetylation step to the post-acetylation step with taking the distilling rate of the distillate as an index, as compared with the case taking a distilling amount of the distillate as an index.

What is claimed is:

1. An apparatus for controlling a reaction in a production process of a cellulose acetate, which comprises:

(a) an acetylation reactor for acetylating a cellulose under a first pressure in the presence of an acidic catalyst;

(b) pressure reducing means for reducing the pressure of the reaction system;

(c) condensing means for condensing under a given pressure, a gaseous phase component produced during said acetylation to produce a distillate;

(d) monitoring means for monitoring a distilling rate under said first pressure in said distilling step;

(e) pressure regulating means for raising the pressure inside the acetylation reactor to a second pressure when the distillation rate under said given pressure reaches a predetermined reference value of the distillation rate or lower, whereby upon increasing the pressure to said second pressure said acetylation reaction continues under said second pressure, wherein said first pressure is lower than atmospheric pressure, said first pressure is lower than said second pressure, and said reference value of the distilling rate is 2 to 15 parts by weight per minute relative to 100 parts by weight cellulose.

2. The apparatus according to claim 1, said apparatus comprising controlling means for imparting a releasing signal to a pressure controlling means for releasing the first pressure, provided that a distilling rate under said given pressure reaches a predetermined reference value or lower.

3. The apparatus according to claim 1, wherein the pressure inside said acetylation reactor at said first pressure is 40 to 150 torr.

4. The apparatus according to claim 1, wherein said reactor contains relative to 100 parts by weight of the cellulose, 200 to 400 parts by weight of an acetylating agent, 300 to 800 parts by weight of a reaction solvent, and 0.4 to 10 parts by weight of the total weight of the acidic catalyst.

5. An apparatus for controlling a reaction in a production process of a cellulose acetate, which comprises:

(a) an acetylation reactor for acetylating a cellulose under a first pressure in the presence of an acidic catalyst;

(b) a vacuum pump for reducing the pressure of the reaction system;

(c) a condenser for condensing, under a given pressure, a gaseous phase component produced during said acetylation to produce a distillate;

(d) a flow meter for monitoring a distilling rate under said first pressure in said distilling step;

(e) a pressure regulating valve for raising the pressure inside the acetylation reactor to a second pressure when the distillation rate under said given pressure reaches a predetermined reference value of the distillation rate or lower, whereby upon increasing the pressure to said second pressure said acetylation reaction continues under said second pressure, wherein said first pressure is lower than atmospheric pressure, said first pressure is lower than said second pressure, and said reference value of the distilling rate is 2 to 15 parts by weight per minute relative to 100 parts by weight cellulose.

6. The apparatus according to claim 5, wherein said flow meter is a mass flow meter.

* * * * *